Sept. 30, 1958 — N. D. LAMBERSON — 2,854,256
TRAILER HITCH

Filed May 14, 1956 — 2 Sheets-Sheet 1

INVENTOR.
NATHANIEL D. LAMBERSON
BY Rudolph L. Lowell
ATTORNEY

Sept. 30, 1958  N. D. LAMBERSON  2,854,256
TRAILER HITCH

Filed May 14, 1956  2 Sheets-Sheet 2

INVENTOR.
NATHANIEL D. LAMBERSON
BY
Rudolph L. Lowell
ATTORNEY

United States Patent Office 2,854,256
Patented Sept. 30, 1958

2,854,256

TRAILER HITCH

Nathaniel D. Lamberson, Oskaloosa, Iowa, assignor to Ideal Mfg. Co., Oskaloosa, Iowa, a corporation of Iowa Application May 14, 1956, Serial No. 584,483

2 Claims. (Cl. 280—512)

This invention relates generally to trailer hitches and more particularly to a ball and socket type trailer hitch.

An object of this invention is to provide an improved ball and socket type trailer hitch.

Another object of this invention is to provide a ball and socket type hitch in which the socket portion of the hitch consists of a fixed jaw and a coacting movable jaw and wherein the movable jaw is positively moved between ball locking and unlocking positions relative to the fixed jaw.

A further object of this invention is to provide a trailer hitch of the above type which includes a manually operable handle for moving the movable jaw between the locking and unlocking positions and a locking device for positively maintaining the lever in a position corresponding to the locking position of the movable jaw.

Another object of this invention is to provide a trailer hitch of the above type in which substantially all of the movable parts are housed so as to be weather protected.

Still another object of this invention is to provide a trailer hitch which is simple in construction, economical to manufacture and efficient in operation in connecting a trailer to an automobile or the like.

Further objects, features and advantages of this invention will become apparent from a consideration of the following description when taken in connection with the accompanying drawing in which.

Figure 1:
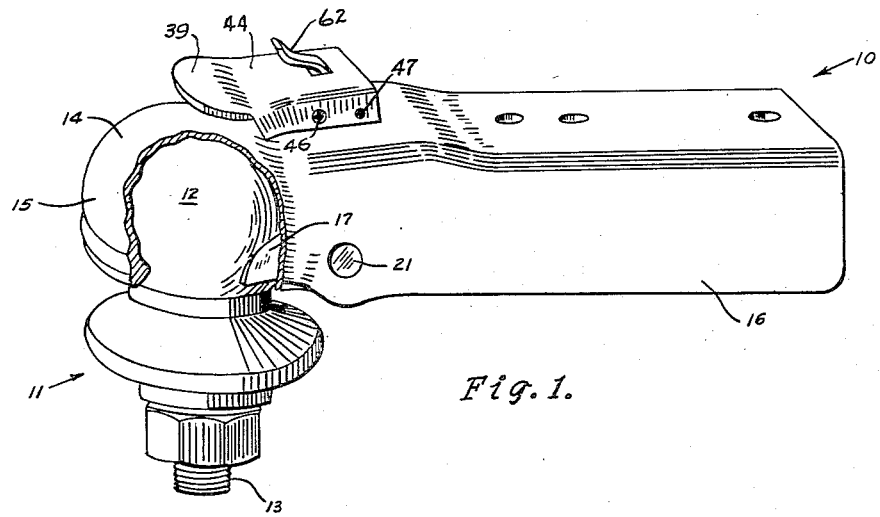
Fig. 1 is a perspective view of the ball and socket type hitch of this invention, with a portion broken away for the purpose of clarity and showing the hitch in a ball locking position.
Figure 4:
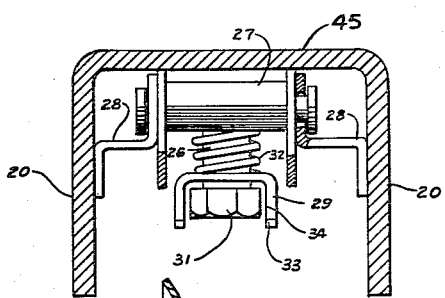
Fig. 4 is a transverse sectional view looking substantially along the line 4—4 in Fig. 3.

With reference to the drawing, the trailer hitch of this invention, indicated generally at 10, is shown in Fig. 1 as including a ball unit 11, of well known construction, having a ball shape upper end portion 12, and a depending bolt portion 13 for attachment to the frame or bumper of an automobile or other vehicle. The ball member 12 is adapted to be received within a partial socket shape portion 14 at what will hereinafter be referred to as the front end 15 of a shell or body member 16 which is of an inverted U-shape in transverse section (Fig. 4).

Arranged within the shell member 16 for movement toward and away from the end 14 thereof is a jaw member 17 having a partial socket shape portion 18 adapted to engage one side of the ball 12. In the ball engaging position of the jaw member 17 (Figs. 1 and 3) the ball 12 is gripped between the movable jaw 17 and the shell portion 14 which functions as a fixed jaw.

Figure 2:
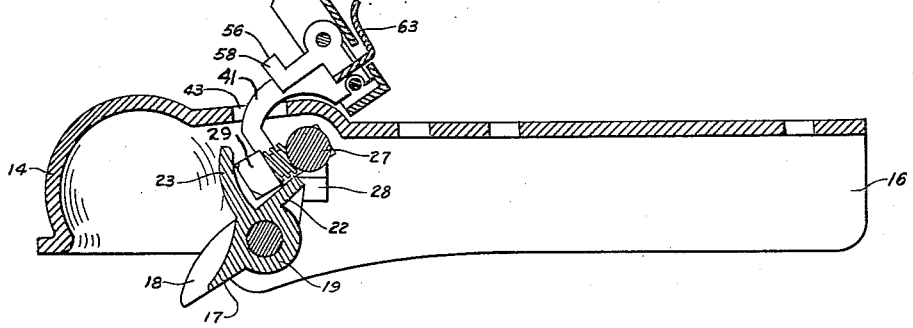
Fig. 2 is a longitudinal sectional view of the socket forming shell portion of the hitch of this invention, shown in an open or unlocking position.
Figure 3:
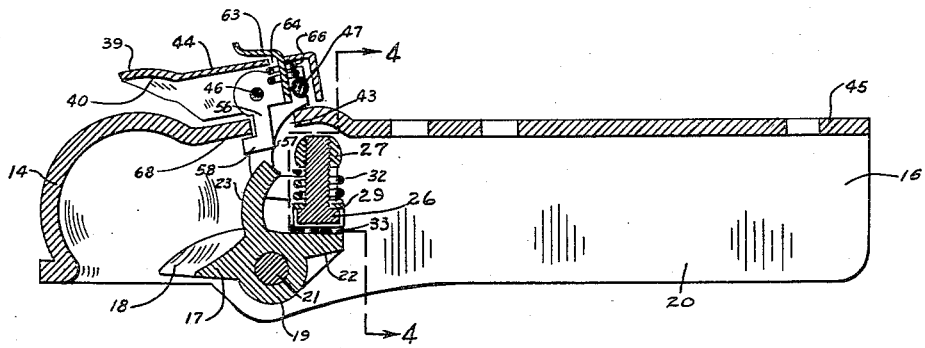
Fig. 3 is a longitudinal sectional view of the shell portion of the hitch of this invention shown in a locking position.
Figure 5:
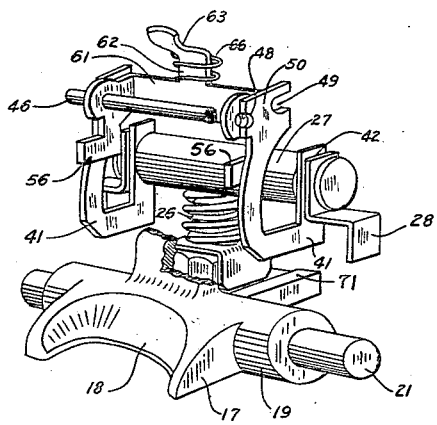
Fig. 5 is a perspective view of the movable jaw member and the operating parts therefor in the shell portion of the hitch of this invention.

As best appears in Figs. 3 and 5, the movable jaw 17 is provided with a transversely extended boss portion 19 which is rotatably supported on a shaft 21 secured at its opposite ends to the parallel leg portions 20 of the shell 16. The movable jaw 17 is further provided with a straight projection 22 and a curved projection 23. The projections 22 and 23 are extended substantially radially of the shaft 21 (Figs. 2 and 3) and are angularly spaced from each other.

Arranged within the shell 16 at a position between the projections 22 and 23 is a cap screw 26 (Fig. 4) which is threaded into and projected radially outwardly from a shaft 27 rotatably supported on a pair of brackets 28 secured to and extended inwardly from the shell legs 20. An inverted U-shape clip member 29 received on the secured to and extended inwardly from the shell legs by a spring 32 positioned about the screw 26 and extended between the shaft 27 and the screw head 31. In this position of the clip 29, the free ends 33 of the leg portions 34 thereof project downwardly below the screw head 31 for a purpose to appear later.

As best appears from a comparison of Figs. 2 and 3, in the ball engaging or locking position of the movable jaw 17 (Fig. 3) the lower ends 33 of the spring clip legs 34 engage the projection 22 on the jaw 17 to positively prevent any movement of the jaw 17 in a counter clockwise direction out of engagement with the ball 12. In the unlocking or ball releasing position of the movable jaw 17 (Fig. 2) the screw head 31 and the clip 29 are in moved positions in which the clip 29 engages the projection 23, thus holding the movable jaw 17 in a ball releasing position.

For moving the screw 26 between the positions illustrated in Figs. 2 and 3, a pair of arms 41, of an irregular shape, are secured at their ends 42 to the shaft 27. In the ball engaging position of the jaw 17 (Fig. 3) the arms 41 extend forwardly from the shaft 27 and upwardly through corresponding elongated openings or slots 43 in the base portion 45 of the shell member 16. At their upper ends 50, the arms 41 are connected to a handle member 44, which is of an inverted U-shape in transverse section, by a pair of elongated rivets 46 and 47 carried by the handle 44 and extended through notches 48 and 49 in opposite sides of the arms 41.

As best appears in Figs. 2 and 3, the handle 44 is formed at its forward end 39 with a curved thumb receiving portion 40 to facilitate upward and rearward swinging movement thereof from a substantially horizontal position shown in Fig. 3 to a substantially upright position shown in Fig. 2. On such upward swinging movement of the handle 44, the arms 41 are moved upwardly and rearwardly to thus provide the desired clockwise rotation of the shaft 27. Conversely, on manual movement of the handle 44 from its upright position (Fig. 2) to its horizontal position (Fig. 3) the arms 41 are moved downward to provide for the desired counterclockwise rotation of the shaft 27.

For locking the handle 44 in its substantially horizontal position illustrated in Fig. 3 a pair of locking fingers 56 are rotatably mounted on the rivet 46 at a position between the arms 41. As best appears in Fig. 5, the fingers 56 correspond to the arms 41 with each finger 56 being positioned adjacent to a corresponding arm 41 for movement through the slot 43 in the shell 16 corresponding to the arm 41. Each finger 56 is formed at its lower end 57 with a forwardly extended projection 58 for engaging the underside of a portion 68 of the shell 16 adjacent to and forwardly of the corresponding slot 43. In such position of the fingers 56 (Fig. 3), the projections 58 effectively prevent any rotation of the handle 44 toward its upright position illustrated in Fig. 2.

The fingers 56 are formed integral with a strap 61 extended therebetween (Fig. 5) and provided with an upwardly extended projection 62 which terminates in a forwardly and upwardly extended actuating lever 63. As shown in Fig. 3, the projection 62 extends upwardly through a narrow slot 64 in the handle member 44 with the curved lever 63 extending forwardly and upwardly from the slot 64. A spring 66 (Figs. 3 and 5) positioned about the projection 62 and extended between the connecting strap 61 and the handle 44 biases the locking fingers 56 toward their locking positions illustrated in Fig. 3.

To move the locking fingers 56 to positions in which they are movable through the slots 43 with the corresponding arms 41, the lever 63 is moved downwardly against the handle 44 to thus move the projection 62 upwardly against the pressure of the spring 66. Such upward movement of the handle 62 results in a counterclockwise rotation of the fingers 56 and a consequent rearward movement of the projections 58 to positions in which they are freely movable upwardly through the slots 43 with the arms 41. As soon as the fingers 56 have been moved out of the slots 43, the lever 63 may be released.

Figure 6:
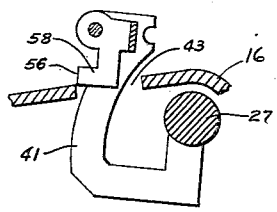
Figs. 6 and 7 are fragmentary partial sectional views of the shell portion of the hitch showing a locking mechanism for the movable jaw in progressively moved positions.
Figure 7:
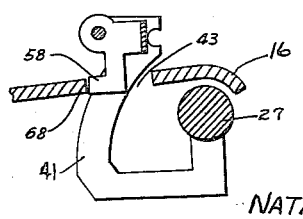

On downward movement of the handle 44 toward its locking position shown in Figs. 1 and 3, the portions 68 of the shell 16 at the forward ends of the slots 43 act as cams to move the finger projections 58 rearwardly, against the action of the spring 66, during downward movement of the projections 58 through the slots 43. As shown in Fig. 6, the projections 58 are of a length to be initially received within the slots 43 on downward movement of the handle 44 which swings about the shaft 27. On further downward movement of the handle 44 the fingers 56 are concurrently moved downwardly and swung rearwardly (Fig. 7) in a counterclockwise direction as viewed in Figs. 6 and 7. This swinging movement is by virtue of the engagement of the projections 58 with the shell portion 68 and takes place against the pressure of the spring 66. When the projections 58 have been moved through the slots 43 the spring 66 acts to move the projections 58 forwardly to positions below the portion 68 for preventing upward movement of the handle 44.

In use, assume that the movable jaw 17 is in its ball releasing position shown in Fig. 2. In this position of the jaw 17, the shell 16 is readily manipulated so that the ball 12 is received within the shell portion 14. To lock the ball 12 within the shell 16, the handle 44 is swung downwardly and forwardly to its position shown in Fig. 3. During such movement, the clip 29 engages the projection 22 on the movable jaw 17 so as to swing the jaw 17 in a clockwise direction as viewed in Figs. 2 and 3. When the handle 44 has been moved downwardly to the position shown in Figs. 1 and 3, the jaw portion 18 is moved into engagement with the ball 12 to lock the ball 12 between the jaw 17 and the shell portion 14. In this ball engaging position of the jaw 17, the fingers 56 act to prevent any movement of the handle 44 and thus maintain the movable jaw 17 in its ball engaging position. The spring 32 positioned about the bolt 26 maintains the clip 29 in yieldable engagement with the projection 22 so as to prevent any rattling engagement of the bolt head 31 and the projection 22. In the event an overload is encountered which is sufficient to overcome the pressure of the spring 32, the bolt 26 engages the projection 22 to prevent accidental removal of the ball 12.

To release the ball 12 from the shell 16, the terminal end portion 63 of the handle 62 is pressed, or moved downwardly toward the handle 44, concurrently with thumb manipulation of the handle portion 40 to swing the handle 44 upwardly and rearwardly to its position shown in Fig. 2. During such movement of the handle 44, the clip 29 and the associated bolt 26 are swung in a clockwise direction as viewed in Figs. 2 and 3 to engage the movable jaw projection 23 and thus positively rotate the jaw 17 in a counter-clockwise direction. When the handle 44 is moved to its upright position shown in Fig. 2, the jaw 17 has been moved to a position which provides for the ready withdrawal of the ball 12 from the shell 16. As a result, since the movable jaw 17 is moved in response to swinging of the handle 44, the jaw cannot get jammed or rusted in a position which would prevent manipulation of the shell 16 to withdraw the ball 12, as is sometimes the case in hitches which rely on gravity for moving a jaw to a ball releasing position.

From the above description, it is seen that this invention provides a trailer hitch 10, of ball and socket type, which is readily operable to clamp a ball 12 within a shell 16. Since the movable jaw 17 is positively moved to jaw engaging and jaw releasing positions by the engagement of the clip 29 with the projections 22 and 23, respectively, the desired movement of the jaw 17 in response to manipulation of the handle 44 is assured. Moreover, the locking of the handle 44, by means of the fingers 56, in a position corresponding to a position of the clip 29 in engagement with the projection 22 prevents any accidental movement of the movable jaw 17 toward a ball releasing position. By virtue of the inverted U-shape configurations of the shell 16 and the handle 44, substantially all of the operative and movable parts of the hitch 10 are housed and thus protected from the weather. In other words, the only exposed parts are the handle 44 and the lever 63, the exposure of which to the weather cannot affect the operability of the hitch 10. Accordingly, the desired operation of the hitch 10 over a prolonged service life is at all times assured.

As best appears in Fig. 5, the projection 22 is provided at its transversely opposite sides with upwardly extended short projections 71, only one of which is shown. The projections 71 are of a height to prevent any turning of the bolt 26 and clip 29 in the ball locking position of the jaw 22 (Fig. 3). Accidental release of the ball 12 is thus positively prevented. However, when the ball 12 is removed and the jaw 17 is moved to the position shown in Fig. 3, the bolt 26 and clip 29 may be rotated as a unit in increments of one-half revolution to adjust the jaw 17 for wear or for a different size ball 12.

In addition, the bolt 26 is in an over-center relation with the arms 41 in the Fig. 3 position of the jaw 17. In other words pressure of the ball 12 on the jaw 17 tends to move the bolt 26 in a counterclockwise direction as viewed in Fig. 3, thus exerting a downward pull on the arms 41. As a result, forces on the ball 12 are not transmitted to the locking fingers 56 as forces which would weaken the locking fingers 56.

In addition, the convenient assembly of the handle 44 and lever 63 for operation with one hand facilitates a quick locking and unlocking operation of the hitch 10.

Although the invention has been described with respect to a preferred embodiment thereof, it is to be understood that it is not to be so limited since changes can be made therein which are within the scope of the appended claims.

I claim:

1. A ball and socket type trailer hitch comprising an elongated shell member of an inverted U-shape in transverse cross section having a fixed jaw portion at one end of a shape to receive a ball therein, a rockable member rockably mounted on and positioned within said shell member and having a first radially extended portion movable into and away from a ball engaging position, a second portion on said rockable member extended diametrically from said first portion, and a third portion on said rockable member radially extended upwardly in a direction normal to said first two portions, means for moving said rockable member including an operating member pivotally mounted on said shell member and extended between and engageable with said second and third portions to move said first portion into and away from said ball engaging position, an actuating member for moving said operating member having a handle portion projected upwardly through said shell member, means for releasably securing said handle member to said shell member when said first portion is in said ball engaging position, and yieldable means on said operating member engageable with said second portion in a ball engaging position of said first portion so that the thrust received by said first portion is initially resisted by said yieldable means, and finally resisted by said operating member for transmission to said shell member, with said first and second portions being extended substantially longitudinally of said shell member and said operating member extended upwardly from said second portion, when said first portion is in a ball engaging position.

2. A ball and socket type trailer hitch comprising an elongated shell member of an inverted U-shape in transverse cross section having a socket portion formed at one end to receive a ball therein, a rockable member located within and rockably supported on said shell member at a position inwardly of and at the open end of said socket, said rockable member having first and second portions extended diametrically thereof, and a third portion projected radially at a position intermediate said first and second portions, means for moving said rockable member including an operating member having one end pivotally mounted on said shell member adjacent the top side thereof and extended between and engageable with said second and third portions to move said first portion into and out of a position in engagement with the underside of a ball received within said socket, an actuating member for moving said operating member having a handle projected upwardly through said shell member, said first and second portions being extended longitudinally of said shell member and said operating member being engaged with and extended normal to said second portion when said first portion is in a ball engaging position, and means for releasably locking said handle with said shell member when said first portion is in a ball engaging position.

References Cited in the file of this patent

UNITED STATES PATENTS

| | | |
|---|---|---|
| 1,240,995 | Menhall | Sept. 25, 1917 |
| 1,254,199 | Brice | Jan. 22, 1918 |
| 1,757,009 | Dumond | May 6, 1930 |
| 2,125,611 | Hennicke | Aug. 2, 1938 |
| 2,613,948 | Klein | Oct. 14, 1952 |
| 2,693,970 | Coleman | Nov. 9, 1954 |

FOREIGN PATENTS

| | | |
|---|---|---|
| 710,466 | Germany | Sept. 13, 1941 |